Sept. 21, 1965   C. T. FLISS   3,207,358
WATER STORAGE TANKS AND METHODS OF MAKING THE SAME
Filed July 27, 1961   2 Sheets-Sheet 1
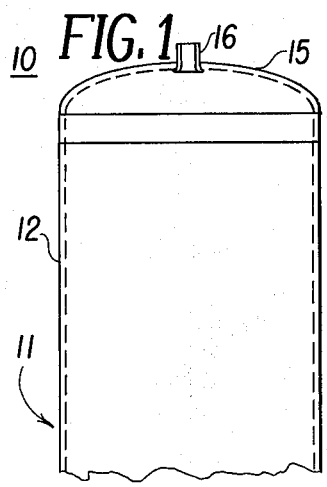
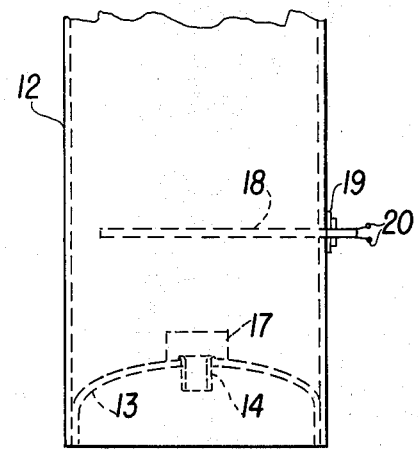
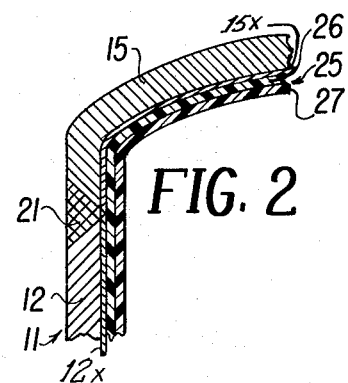
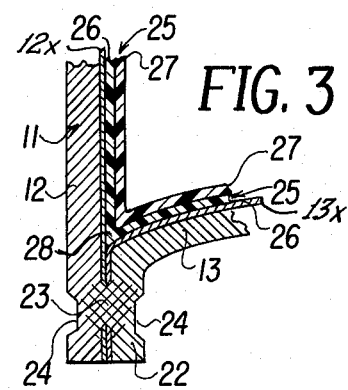
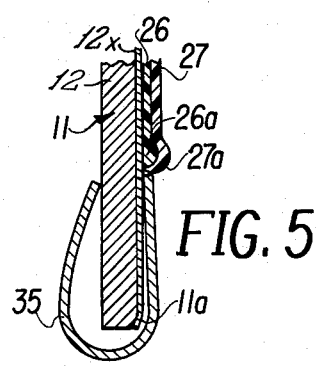
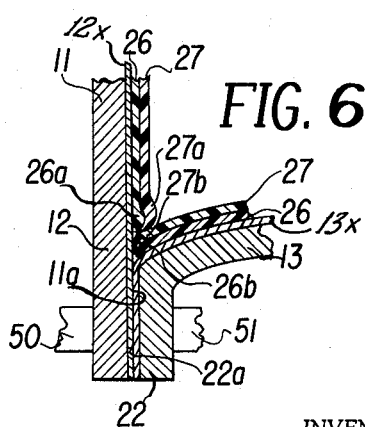
INVENTOR.
Carl T. Fliss
BY
Brangley Baird Clayton,
Miller & Vogel, Attys.

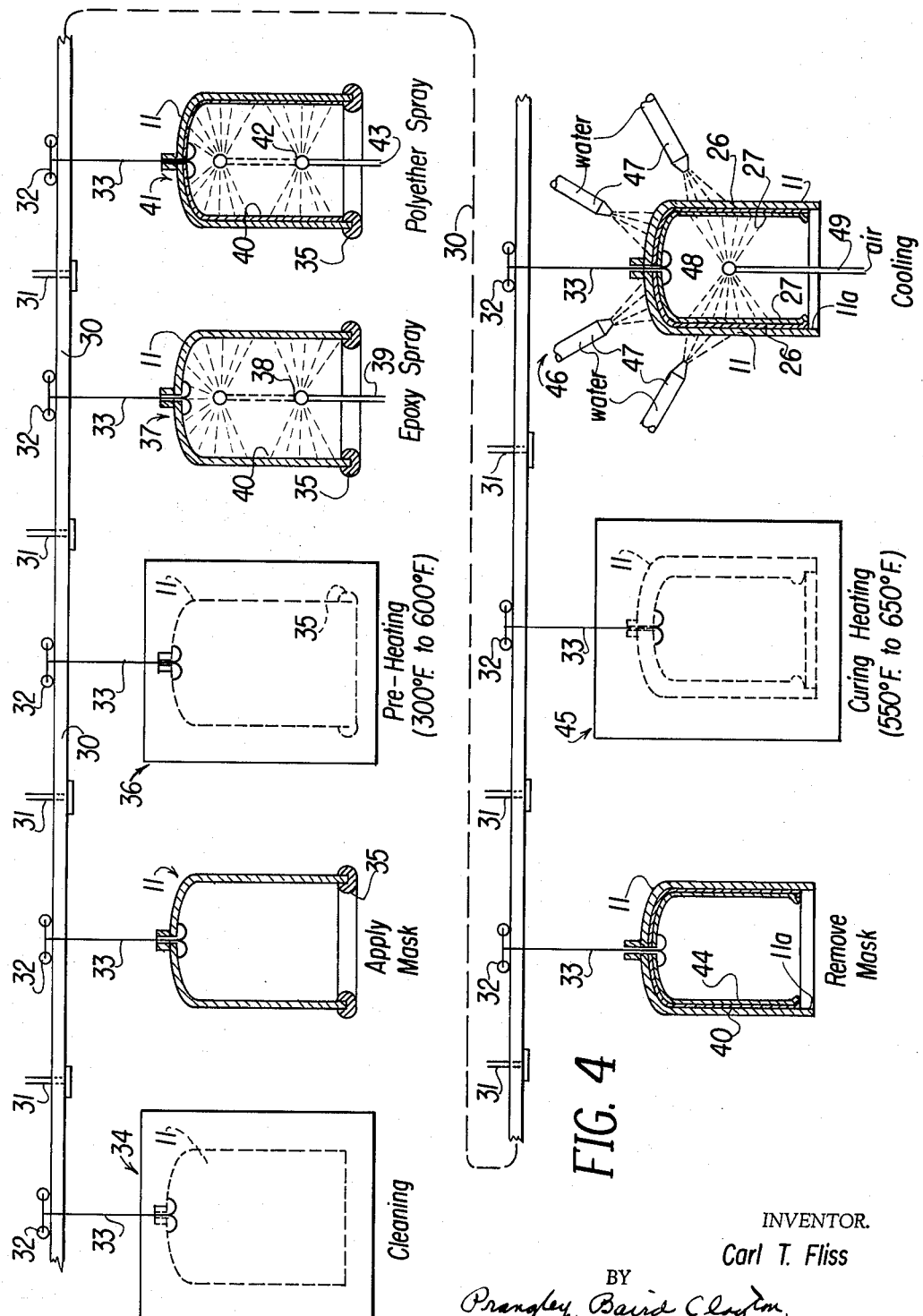

United States Patent Office 3,207,358
Patented Sept. 21, 1965

3,207,358
WATER STORAGE TANKS AND METHODS OF MAKING THE SAME
Carl T. Fliss, Oak Park, Ill., assignor to General Electric Company, a corporation of New York
Filed July 27, 1961, Ser. No. 128,929
7 Claims. (Cl. 220—64)

The present invention relates to water storage tanks, particularly to such tanks especially designed for use in hot water heaters, or the like, and to methods of making the same.

It is a general object of the invention to provide a water storage tank that incorporates an improved liner arrangement which resists the corrosive attack of water including the corrosive atack of water containing such common corrosion agents as carbon dioxide, oxygen, chloride ion, sulfate ion, etc.

Another object of the invention is to provide a water storage tank that comprises a hollow body formed of steel and including a plastic liner therefor covering substantially the entire inner exposed surfaces thereof, the plastic liner being substantially impervious to corrosive attack by water containing such common corrosive agents as carbon dioxide, oxygen, chloride ion, sulfate ion, etc.

Yet another object of the invention is to provide an improved water storage tank comprising a hollow body formed of steel and having a plastic liner therein wherein the plastic liner has a low water absorptivity.

Still another object of the invention is to provide an improved method of applying plastic coatings to steel bodies and particularly to the interior of hollow steel bodies.

A further object of the invention is to provide an improved method of making a hot water tank of the type including a hollow body having a side wall closed at one end and a dome-shaped bottom header closing the other end thereof and secured thereto by resistance welding, the improved hot water tank having a plastic liner entirely covering the inner surfaces of the tank.

Further features of the invention pertain to the particular arrangement of the elements of the water storage tank and of the steps of the method, whereby the above-outlined and additional operating features thereof are attained.

The invention, both as to its organization and method of operation, together with further objects and advantages thereof, will best be understood by reference to the following specification, taken in connection with the accompanying drawings, in which:

FIGURE 1 is a side elevational view of a water storage tank incorporated in an electric water heater and embodying the present invention;

FIG. 2 is a greatly enlarged fragmentary vertical sectional view of the upper portion of the water storage tank, illustrating the construction thereof at the junction between the upper end of the tubular side wall and the top header;

FIG. 3 is a greatly enlarged fragmentary vertical sectional view of the lower portion of the water storage tank, illustrating the construction thereof at the junction between the lower end of the tubular side wall and the bottom header;

FIG. 4 is a diagrammatical view with certain parts in section, illustrating the steps in coating the hollow tank body in accordance with the method of the present invention;

FIG. 5 is an enlarged fragmentary view in vertical section, illustrating the masking member applied to the lower end of the hollow tank body with the resin coating applied to the exposed portion of the tank body above the masking member; and FIG. 6 is a greatly enlarged fragmentary vertical sectional view of the lower portion of the water storage tank showing the body and the bottom header in the assembled position with the wheels of the resistance welding machine in position thereon prior to the formation of the weld between the lower end of the tank body and the side flange of the bottom header.

Referring to FIG. 1 of the drawings, there is illustrated a water storage tank 10 of an electric water heater, the tank 10 being made in accordance with and embodying the features of the present invention therein. The tank 10 comprises an upstanding body 11 formed of steel and including a tubular side wall 12, a bottom header 13 carrying a threaded water inlet spud 14, and a top header 15 carrying a threaded water outlet spud 16. The bottom header 13 also carries an inlet water diffusing structure 17 disposed in the lower portion of the body 11 for the usual purpose of preventing mixing of the cold incoming water and the hot stored water in the tank 10. The water storage tank 10 also has disposed therein an immersion type heating element 18 extending through an opening in the side wall 12 a short distance above the bottom header 13, the heater 18 being held in position by a threaded coupling member 19 and also being provided with suitable connections 20 for attachment to a source of electrical energy.

As is best seen in FIG. 2 of the drawings, the side wall 12 of the body 11 is joined to the upper header 15 as by a weld 21 so as to provide a substantially continuous joint therebetween having smooth inner and outer surfaces. Completely coating the interior surfaces of the body 11 and the top header 15 is a resin liner 25 including an inner layer 26 intimately bonded to the interior surfaces throughout the contacting surfaces thereof and an outer layer 27 covering the entire adjacent surfaces of the inner layer 26 and intimately bonded thereto throughout the contacting surfaces thereof.

The bottom header 13 and the side wall 12 of the body 11 are also joined integrally, see FIG. 3 of the drawings. To this end the bottom header 13 has a side flange 22 formed thereon and extending completely therearound and having an exterior diameter slightly greater than the interior diameter of the side wall 12 at the lower end thereof. In assembling the bottom header 13 to the side wall 12, the header 13 is forcefully fitted into the lower end of the bottom 12 as by an hydraulic ram and after being inserted into the body 12, a resistance weld 23 is formed between the lower end of the side wall 12 and the side flange 22 in the usual manner such as by the use of a pair of pressure rollers 50 and 51 (see FIG. 6 also) that carry the welding current and are urged into firm pressing engagement with the side wall 12 and the side flange 22, the current flowing between the wheels 50 and 51 through the adjacent portion of the steel in the wall 12 and the flange 22 serving to melt the steel and to weld it into a single coherent mass or nugget 23, the pressure of the wheels 50 and 51 against the heated metal serving to form depressions 24 in the contacting surfaces of the wall 12 and the flange 22. From FIG. 3 it will be seen that the resin liner 25 also completely covers the inner surface of the bottom header 13 and is integrally joined to the resin liner 25 on the side wall 12.

The inner layer 26 is formed of a synthetic organic plastic resin which has superior properties of adhesion to steel and which has superior properties of adhesion to the outer layer 27 and which further has a softening point above 200° F. so as to insure that the water within the tank 10 will not adversely affect the desired properties of the inner layer 26. A wide variety of synthetic organic plastic resins possess the necessary characteristics to form the inner layer 26, but the preferred resin is an epoxy resin which exhibits to a marked degree the desired characteristic of tenaciously bonding to the steel surfaces of the side wall 12 and the headers 13 and 15.

The epoxy resin is thermosetting and results from the reaction of an epoxy group having the general formula:

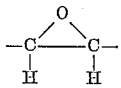

with one of a variety of compounds having active hydrogen atoms including amines, acids, phenols, alcohols and thiols, the reaction opening the epoxy ring and forming a larger molecule with a secondary hydroxyl group in accordance with the following general formula:

The secondary alcohol formed in this manner is by no means as reactive as the epoxide group but it does combine with fatty acids, anhydrides, phenolic and amino resins, and epoxide groups in other molecules.

This epoxy resin also will firmly bond to the outer resin layer 27 and will readily withstand the operating temperature of 170° F. of the heater 10.

The outer layer 27 is also formed of a synthetic organic plastic resin, and more specifically such a resin that is characterized by low water absorptivity and by having a softening point above 200° F. Although a wide variety of resins possess these necessary characteristics, the preferred class of resins are the polyether resins and particularly the chlorinated polyether resins, a preferred specific example being 2,2-chloromethylpropyl polyether resin that is sold under the trademark "Penton" by the Hercules Powder Company.

This chlorinated polyether resin has the general formula:

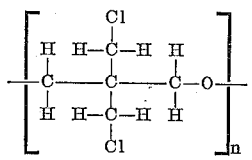

This chlorinated polyether resin is thermoplastic and will firmly bond to the inner resin layer 26 and will form a continuous coating thereover on the interior of the tank 10. This resin also has a low water absorptivity of about 0.003% by weight and well within the preferred range of water absorptivity of no greater than 0.01% by weight of the resin in accordance with the preferred form of the present invention. In addition the chlorinated polyether resin has a softening point well above 200° F. so that it will not be damaged or deformed by the normal operating temperature of the tank 10 which is about 170° F.

It has been found in practice that the thicknesses of the resin layers 26 and 27 may vary widely but the preferred range of thickness of the inner resin layer 26 is in the range from about 1 mil to about 3 mils and the preferred range of thickness of the outer resin layer 27 is in the range from about 8 mils to about 12 mils. Such thicknesses of the resins provide for high utility of the lined tank 10, this thickness of the inner layer 26 assuring complete coverage and intimate bonding to the entire interior surface of the tank 10 and also assuring adequate bonding to the outer resin layer 27. The preferred thickness of the outer resin layer 27 gives a long service life for the tank 10, an outer layer 27 of the prescribed thickness having a service life substantially equal to the best tanks now available commercially and during its service life protecting both the steel tank 10 and the inner resin layer 26 against corrosive attack of water including water containing such common corrosion agents as carbon dioxide, oxygen, chloride ion, sulfate ion, etc., the resin layer itself withstanding such attack without appreciable deterioration throughout the usual life of the tank 10.

There is shown in FIG. 4 of the drawings a preferred method of applying the resin layers 26 and 27 to the interior of the tank body 11; it is to be understood that the resin liner 25 is applied in a like manner to the bottom header 13 prior to assembly thereof with the tank body 11. The tank body 11 during the coating thereof can be conveniently supported upon a rail 30 mounted above an underlying supporting surface by means of hangers 31, the rail 30 being adapted to receive thereon carriages 32 having depending support rods 33 mounted thereon. A tank body 11 to be coated is mounted upon the support 33 and is carried through various processing stations thereon as the carriage 32 is propelled along the rail 30.

In the first station, designated by the numeral 34, the tank body 11 is subjected to conventional cleaning and surface preparation steps to prepare particularly the interior surface thereof for the application of the liner 25 thereto. The cleaning process preferably includes a first cleaning with an alkaline solution followed by a solvent cleaning to insure that all foreign matter, rust, and grease-like materials are removed therefrom. The interior surface is then grit blasted and the residue from the grit blasting blown off. At this point it may be desirable to form a displacement flash coating of nickel on the interior surface of the body 11 although it is to be understood that the resin liner 25 can be applied without the use of a displacement coating of nickel. The displacement coating of nickel is provided by applying to the interior surface of the tank body 11 a solution of nickel sulfate in sulfuric acid, this solution upon contact with the steel surface of the tank 11 forming a displacement coating of nickel thereon. At the next station in the processing system, the mask 35 is applied to the lower end of the steel body 11, the mask 35 extending completely around the inner periphery of the body 11 at the open end thereof and effectively shielding the lowermost portion 11a thereof from the subsequent spraying operations. The details of construction of the mask 35 and the cooperation thereof with the steel tank body 11 are best illustrated in FIG. 5 of the drawings.

After the application of the mask 35 to the lower end of the tank body 11, the carriage 32 is moved to the next processing station which comprises a furnace generally designated by the numeral 36 in which the body 11 is preheated to an elevated temperature in the range from about 300° F. to about 600° F., the preferred temperature range for preheating when utilizing an epoxy resin in the inner layer 26 being in the range from about 475° F. to about 500° F. The preheated tank body 11 is then moved to the next processing station generally designated by the numeral 37 in which the epoxy resin forming the inner layer 26 is applied to the interior thereof. To this end there is provided at the station 37 a spray head 38 having a connection 39 leading to a supply of granular epoxy resin having a particular size of approximately 200 mesh and a suppply of air at ambient temperature for moving the granular epoxy resin through the conduit 39 to the spray head 38. The spray head 38 may be one of the commercially available flocking guns and is mounted for vertical movement within the interior of the tank body 11 so as uniformly to apply the granular epoxy resin to the interior surface thereof. The epoxy resin will fuse at the surface temperature of the tank body 11 and will adhere thereto and will spread across the surface thereof to form a continuous layer that is also partially cured to the tacky state thereof at the temperature encountered. It will be noted that the portion of the inner surface of the tank body 11 covered by the mask 35, the surface designated by the numeral 11a, will not be covered and in fact a bead of the resin will pile up upon the upper inner end of the mask 35 to provide a quantity of resin 26a that will be useful as will be more fully explained hereinafter. The vertical movement of the spray head 38 with respect to the tank body 11 can be adjusted so as to provide a uniform coating of the epoxy resin on the exterior thereof with the exception of the bead 26a on the upper end of the mask 35 so as to provide a uniform layer of partially cured epoxy resin in a tacky state thereon.

The tank body 11 is immediately moved to a second spray position in which a second spray head 42 is inserted therein and moved vertically with respect thereto to apply a second resin layer on top of the first resin layer 40. The spray head 42 may also be of the commercially available flocking gun and is supplied through a conduit 43 with granular chlorinated polyether resin of about 100 mesh conveyed in a stream of air at the ambient temperature. The polyether resin will readily adhere to the tacky surface of the partially cured epoxy layer 40 but will not fuse at the temperature thereof. It has been found however that a sufficient quantity of the polyether resin can be adhered to the partially cured layer 40 in this manner to provide a substantial thickness of the fused polyether resin and more particularly a thickness in the order of about 8 to 12 mils thereof in the fused outer layer 27. Again the mask 35 will prevent the polyether resin from contacting the interior surface 11a but the bead 26a of the epoxy resin will collect a substantial quantity of the polyether resin thereon as a bead 27a.

The tank body 11 now has two layers of resin thereon, the first inner layer being formed of epoxy resin which is fused but only partially cured and in the tacky state, this layer being designated by the numeral 40, and a second or outer layer of polyether resin applied to the inner layer 40 and adhesively secured thereto but not fused thereon, this second layer being designated by the numeral 44. The mask 35 is now removed and the tank body 11 placed in a final cure furnace designated by the numeral 45 where the tank body 11 and its adherent resin layers 40 and 44 are heated to a temperature in the range from about 550° F. to about 650° F., the preferred range being from about 590° F. to about 610° F. During this heating of the tank body 11, the inner layer 40 of epoxy resin is fully cured to provide the inner layer 26 for the liner which is strongly adherent on the inner surface of the steel body 11 and throughout the contacting surfaces thereof and is equally adherent to the outer resin layer thereon. The polyether resin layer 44 is fused into a continuous and impervious coating providing the outer resin layer 27 of the liner 25, the outer layer 27 completely covering the inner layer 26 and being intimately bonded thereto throughout the contacting surfaces thereof.

The tank body 11 is taken immediately from the oven 45 and is force cooled quickly to reduce the temperature of the resin layers 26 and 27 to prevent thermal degradation thereof and to prevent loss of adhesion between the interior surface of the body 11 and the epoxy layer 26 and to prevent loss of adhesion between the epoxy layer 26 and the polyether layer 27. Such quick cooling can be accomplished, for example, by spraying cold water from a plurality of nozzles 47 onto the exterior surface of the tank body 11 at a cooling station generally designated by the numeral 46, the water issuing from the nozzles 47 being vaporized and removing large bodies of heat quickly from the steel body 11 and thence from the resin layers 26 and 27. Alternatively, the resin layers 26 and 27 can be cooled directly by blowing cold air upon the surface of the outer layer 27 from a nozzle 48 positioned for vertical reciprocating movement within the body 11, the nozzle 48 being supplied by cold air through a conduit 49. In certain instances it might even be desirable to utilize cooling both by water from the nozzles 47 upon the exterior of the tank body 11 and cooling by air from the nozzle 48 upon the exposed surface of the polyether resin layer 27.

The outer layer 27 has a low water absorptivity in the order of about 0.003% thereof by weight and is impervious to corrosive attack by water containing such common corrosive agents as carbon dioxide, oxygen, chloride ion, sulfate ion, etc.

The tank body 11 produced by the process diagrammatically illustrated in FIG. 4 has the protective resin liner 25 covering the entire upper portion thereof, the liner 25 extending downwardly toward the lower end of the body 11 but terminating a short distance from the bottom thereof to provide the uncoated and clean surface 11a extending completely around the inner periphery of the body 11, the surface 11a being that covered by the mask 35. The inner layer 26 of the liner 25 is formed of a fully cured epoxy resin that is tightly adherent to the surface of the tank body 11 throughout the contacting surfaces thereof and is equally adherent to the outer polyether resin layer 27 throughout the contacting surfaces thereof. In fact it is the primary function of the epoxy layer 26 to form a tightly adherent bond between the liner 25 and the interior surface of the tank body 11, the bond therebetween being substantially greater than that possible by a direct coating of the polyether resin layer 27 upon the surface of the steel body 11. The epoxy layer 26 has a relatively high water absorptivity and does not provide the protection against corrosive attack that is provided by the thermoplastic polyether resin layer 27. In fact it has been found that the combination of the epoxy resin layer 26 with the polyether resin layer 27 increases the resistance of the polyether resin layer 27 to corrosive attack and particularly attack by water containing such common corrosion agents such as carbon dioxide, oxygen, chloride ion, sulfate ion, etc.

The next step in manufacture of the hot water tank 10 is the coating of the upper surface of the bottom header 13 by a process substantially identical to that illustrated in FIG. 4 of the drawings as applied to the tank body 11. More particularly a masking member like the masking member 35 is applied to the exterior surface of the side flange 22 after cleaning of the header 13 and in certain cases after the application of a displacement coating of nickel thereon. The bottom header 13 with the mask applied is then preheated and the two layers of resin applied to the upper surface thereof as viewed in FIG. 6 after which the resin layers are fully cured and fused in the furnace 45; then the coated header is cooled as at 46 in FIG. 4.

The coated bottom header 13 is then forced fitted into the lower open end of the tank body 11 so that the bare outer surface 22a of the side flange 22 is placed in contact with the bare inner surface 11a of the tank body 11. As has been explained above, the outer diameter of the side flange 22 is slightly greater than the interior diameter of the tank body 11 and as a result the bottom header 13 is placed in this position under the force of a hydraulic ram thereby to provide a very tight fit with the tank body 11. It will be noted that a substantial quantity of resin is provided at the juncture between the resin liner of the tank body 11 and the resin liner on the bottom header 13. More specifically, the bead 26a of the epoxy resin on the body 11 and the overlying bead 27a of the polyether resin on the body 11 are placed adjacent to and in contact with corresponding beads 26b of the epoxy resin and 27b of the polyether resin on the bottom header 13. The resistance welding apparatus is then applied to the side flange 22 and to the lower end of the tank body 11 and more particularly one of the welding wheels 50 is placed against the outer surface of the tank body 11 and the other welding wheel 51 is pressed against the opposite surface of the side flange 22 on the bottom header 13. The welding potential is applied across the wheels 50 and 51 and a welding current flows therebetween to heat the metal and to cause the formation of a unified nugget as illustrated at 23 in FIG. 3 and simultaneously substantial pressure is applied to the welding wheels 50 and 51 which cause the wheels to sink into the adjacent surface to form the characteristic indentations 24 that are diagrammatically illustrated in FIG. 3 of the drawings. A good weld is obtained since the surfaces 11a and 22a are very clean and there is no contaminating material thereon that must be removed therefrom during welding or that may be occluded therein.

Simultaneously with the creation of the weld at the point 23, the heating of the metal thereof causes the resin in the layers 26 and 27 and particularly in the beads 26a, 26b, 27a, and 27b to be melted to flow into continuous layers to form a watertight joint between the side wall 12 and the bottom header 13 as is illustrated in FIG. 3 of the drawings. This melting and fusion of the resin layers is accomplished without any degradation thereof, the heat therefor being derived from the heat generated by the resistance welding at the welding point 23. If necessary, cooling can be applied in the area of the fusion of the beads 26a, 26b, 27a and 27b positively to prevent thermal degradation of the resins therein but in most designs of the hot water tank 10 such auxiliary cooling is not needed, the metal of the tank forming a heat sink quickly to remove excess heat from this area.

As noted above, the provision of the flash coatings of nickel upon the surfaces of the body 11 and of the bottom header 13 that receive the resin layers 26 is entirely optional; however, when these coatings are provided, they are carried at 12x and 15x by the respective elements 12 and 15 of the body 11 and at 13x by the bottom header 13; all as shown in FIGS. 2, 3, 5 and 6 of the drawings. Actually, the flash coatings 12x, 15x and 13x have exceeding thinness with respect to the rather thick elements 12, 15 and 13; whereby the thicknesses of the flash coatings mentioned are greatly exaggerated in the drawings, entirely for the purpose of emphasis.

In view of the foregoing, it is apparent that there has been provided in a steel water storage tank an improved resin liner arrangement that affords maximum protection against attack by water containing corrosive components and that there has also been provided an improved method of making such water storage tanks.

While there have been described certain preferred embodiments of the invention, it will be understood that various modifications may be made therein and it is intended to cover in the appended claims all such modifications that fall within the true spirit and scope of the invention.

What is claimed is:

1. A water heater including a water storage tank provided with water inlet and outlet connections and a water heating element; said storage tank comprising a hollow body formed of steel and including a tubular side wall and a pair of opposed end walls, and a liner carried by the interior surfaces of said side wall and said end walls, said liner including an inner layer covering the entire interior surfaces of said walls and intimately bonded thereto throughout the contacting surfaces thereof and an outer layer covering the entire adjacent surfaces of said inner layer and intimately bonded thereto throughout the contacting surfaces thereof, said inner layer being formed of an epoxy resin having superior properties of adhesion to steel and to said outer layer and having a softening point above 200° F., said outer layer being formed of a thermoplastic chlorinated polyether resin having a low water absorptivity not greater than about 0.01% thereof by weight and having a softening point above 200° F.

2. A water heater including a water storage tank provided with water inlet and outlet connections and a water heating element; said storage tank comprising a hollow body formed of steel and including a tubular side wall and a pair of opposed end walls, and a liner carried by the interior surfaces of said side wall and said end walls, said liner including an inner layer covering the entire interior surfaces of said walls and intimately bonded thereto throughout the contacting surfaces thereof and an outer layer covering the entire adjacent surfaces of said inner layer and intimately bonded thereto throughout the contacting surfaces thereof, said inner layer being formed of an epoxy resin having superior properties of adhesion to steel and to said outer layer and having a softening point above 200° F., said outer layer being formed of 2,2-chloromethylpropyl polyether resin having a low absorptivity not greater than about 0.01% thereof by weight and having a softening point above 200° F.

3. The water heater set forth in claim 2, wherein
a nickel coating is provided covering the interior surfaces of said side wall and said end walls.

4. The method of coating the interior of a hollow body formed of steel comprising the steps of cleaning the interior surface of the hollow body to be coated, preheating the hollow body including said surface to a temperature in the range from about 475° F. to about 500° F., applying to said heated interior surface a quantity of an epoxy resin in granular form and characterized by partial cure and fusion upon said heated surface to the tacky state to provide a partially cured layer covering said heated interior surface, applying to said partially cured layer while it is in the tacky state a quantity of a chlorinated polyether resin in granular form and characterized by adherence to said partially cured layer and by substantially no fusion thereupon, heating the hollow body to a temperature in the range from about 590° F. to about 610° F. to complete the cure of said epoxy resin and to fuse said chlorinated polyester resin, and cooling said resins to provide an inner layer of said epoxy resin having a softening point above 200° F. and intimately bonded to said interior surface and to said chlorinated polyester resin throughout the contacting surfaces thereof and to provide an outer layer of said chlorinated polyester resin having a low water absorptivity not greater than about 0.01% thereof by weight and having a softening point above 200° F. and completely covering said inner layer.

5. The method set forth in claim 4,
and further comprising the step of applying a nickel coating to said interior surface of the hollow body.

6. The method set forth in claim 4, wherein
the cooling of said resins is accomplished by spraying water on the exterior surface of the hollow body.

7. The method set forth in claim 4, wherein
the cooling of said resins is accomplished by blowing air at ambient temperature upon the outer surface of the outer layer of resin.

References Cited by the Examiner

UNITED STATES PATENTS

| | | | |
|---|---|---|---|
| 2,722,340 | 11/55 | Feild et al. | 220—64 |
| 2,802,897 | 8/57 | Hurd et al. | |
| 2,884,693 | 5/59 | Wagner | 29—529 |
| 2,957,784 | 10/60 | Schiefelbein | 117—75 |
| 2,992,939 | 7/61 | Larson et al. | 117—75 |
| 2,994,951 | 8/61 | Eubank et al. | 29—529 |
| 3,008,848 | 11/61 | Annonio. | |
| 3,057,746 | 10/62 | Edmonds | 117—75 X |
| 3,075,343 | 1/63 | Davis | 220—64 X |
| 3,089,783 | 5/63 | Carlson et al. | 117—161 |

FOREIGN PATENTS

| | | |
|---|---|---|
| 579,442 | 8/46 | Great Britain. |
| 721,092 | 2/58 | Great Britain. |

OTHER REFERENCES

Taylor: Modern Plastics Encyclopedia Issue for 1961, September 1960, pp. 85–86.

RICHARD D. NEVIUS, *Primary Examiner.*

FOLSOM J. DRUMMOND, WILLIAM D. MARTIN, *Examiners.*